(12) United States Patent
Lin et al.

(10) Patent No.: US 10,180,509 B2
(45) Date of Patent: Jan. 15, 2019

(54) ENVIRONMENT MONITORING SYSTEM AND VIBRATION SENSING DEVICE

(71) Applicant: National Applied Research Laboratories, Taipei (TW)

(72) Inventors: Yung-Bin Lin, Taipei (TW); Yu-Sheng Lai, Hsinchu County (TW); Meng-Huang Gu, New Taipei (TW); Ho-Min Chang, New Taipei (TW); Kuo-Chun Chang, Taipei (TW); Yuan-Chen Liao, Miaoli County (TW); Yung-Kang Wang, Taoyuan (TW); Mei-Yi Li, Hsinchu (TW); Cheng-San Wu, Hsinchu (TW); Wen-Kuan Yeh, Hsinchu County (TW)

(73) Assignee: National Applied Research Laboratories, Taipei (TW)

(*) Notice: Subject to any disclaimer, the term of this patent is extended or adjusted under 35 U.S.C. 154(b) by 318 days.

(21) Appl. No.: 14/876,812

(22) Filed: Oct. 6, 2015

(65) Prior Publication Data
US 2016/0154128 A1 Jun. 2, 2016

(30) Foreign Application Priority Data
Dec. 1, 2014 (TW) .............................. 103141618 A

(51) Int. Cl.
*G01V 1/18* (2006.01)
*G01V 1/16* (2006.01)
*G01H 1/00* (2006.01)

(52) U.S. Cl.
CPC ................. *G01V 1/18* (2013.01); *G01H 1/00* (2013.01); *G01V 1/166* (2013.01)

(58) Field of Classification Search
None
See application file for complete search history.

(56) References Cited

U.S. PATENT DOCUMENTS

| | | | | |
|---|---|---|---|---|
| 5,479,724 A | * | 1/1996 | Nahajski | E02L 33/00 33/719 |
| 2002/0198661 A1 | * | 12/2002 | Strickland | E21B 47/04 702/6 |

(Continued)

FOREIGN PATENT DOCUMENTS

| CN | 101799295 A | 8/2010 |
|---|---|---|
| JP | S5524303 | 2/1980 |

(Continued)

*Primary Examiner* — Hovhannes Baghdasaryan
(74) *Attorney, Agent, or Firm* — Winston Hsu

(57) ABSTRACT

An environment monitoring system is utilized for monitoring an environmental variation status of a riverbed, a lake floor, or a seabed. The environment monitor system includes a wire drawing device configured at a monitoring point for releasing and tightening a transmission wire; a fixing pipe laid between the monitoring point and a structure layer for containing the transmission wire; a plurality of vibration sensing devices respectively configured on the transmission wire for converting sensed vibration energy to a plurality of electric signals and transmitting the plurality of electric signals by the transmission wire; an analyzing device coupled with the wire drawing device and the transmission wire for obtaining a released length of the transmission wire by the wire drawing device and determining the environmental variation status according to the released length and the plurality of electric signals to perform monitoring.

7 Claims, 6 Drawing Sheets

(56) References Cited

U.S. PATENT DOCUMENTS

| | | | | |
|---|---|---|---|---|
| 2006/0256651 | A1* | 11/2006 | Sanders | G01V 1/02 367/15 |
| 2007/0215345 | A1* | 9/2007 | Lafferty | E21B 43/26 166/250.1 |
| 2010/0182161 | A1* | 7/2010 | Robbins | E21B 47/122 340/853.7 |
| 2011/0255735 | A1* | 10/2011 | Chang | H04N 7/185 382/100 |
| 2011/0309835 | A1* | 12/2011 | Barber | G01V 3/00 324/339 |
| 2012/0138291 | A1* | 6/2012 | Tomberlin | E21B 47/026 166/254.2 |
| 2012/0226441 | A1* | 9/2012 | Willden | E01D 22/00 702/2 |
| 2013/0233079 | A1* | 9/2013 | Swartz | G01F 1/56 73/579 |
| 2015/0009041 | A1* | 1/2015 | van der Ende | E21B 47/122 340/854.9 |

FOREIGN PATENT DOCUMENTS

| | | |
|---|---|---|
| JP | H11125524 A | 5/1999 |
| JP | 11275404 | 10/1999 |
| JP | H11351867 A | 12/1999 |
| JP | 2001108491 A | 4/2001 |
| JP | 2001303881 | 10/2001 |
| TW | 201033589 | 9/2010 |
| TW | 201421031 | 6/2014 |

\* cited by examiner

ENVIRONMENT MONITORING SYSTEM AND VIBRATION SENSING DEVICE

BACKGROUND OF THE INVENTION

1. Field of the Invention

The present invention relates to an environment monitoring system and a vibration sensing device, and more particularly, to an environment monitoring system and a vibration sensing device capable of easily and precisely monitoring a scouring depth of a riverbed by utilizing the vibration sensing devices which do not need external electric power.

2. Description of the Prior Art

Recently, huge rainfall in a short time happens all the time, which causes water levels of rivers rising rapidly and the rivers flowing fast, such that riverbeds are scoured and lowered, and bridge foundations are exposed seriously. When a structure under a bridge foundation is instable and active force is larger than a force that the bridge foundation can bear, the bridge foundation may be sagged, tilted, sideshifted, or even collapsed. Even worse, it may result in traffic disruption and casualties.

Therefore, how to monitor a scouring depth of a riverbed so as to take related measures in advance is an important and tough objective in the field.

SUMMARY OF THE INVENTION

It is therefore a primary objective of the present invention to provide an environment monitoring system, which may easily and precisely monitor the scouring depth of the riverbed by utilizing the vibration sensing devices which do not need external electric power, to prevent the disasters of the bridge foundation being scoured.

The present invention discloses an environment monitoring system, configured for monitoring an environmental variation status of a riverbed, a lake floor, or a seabed. The environment monitoring system comprises a wire drawing device, disposed at a monitoring point above the riverbed, the lake floor or the seabed, for releasing and tightening a transmission wire; a fixing pipe, laid between the monitoring point and an internal of a structure layer of the riverbed, the lake floor or the seabed, for containing the transmission wire, to draw the transmission wire from the internal of the structure layer to the wire drawing device; a plurality of vibration sensing devices, electrically connected to a plurality of wires within the transmission wire, for converting sensed vibration energy to a plurality of electric signals correspondingly and transmitting the plurality of electric signals via the transmission wire; and an analyzing device, coupled to the wire drawing device and the transmission wire, for obtaining a released length of the transmission wire from the wire drawing device, receiving the plurality of electric signals from the transmission wire, and determining the environmental variation status according to the released length and the plurality of electric signals to perform monitoring.

The present invention further discloses a vibration sensing device. The vibration sensing device comprises a first coil board, comprising a first substrate, a first metal coil, a second metal coil and a first metal connecting hole, wherein the first metal coil and the second metal coil are disposed on a top side and a bottom side of the first substrate, and connected with each other in series by penetrating through the first metal connecting hole of the first substrate; a second coil board, substantially disposed in parallel with the first coil board, comprising a second substrate, a third metal coil, a fourth metal coil and a second metal connecting hole, wherein the third metal coil and the fourth metal coil are disposed on a top side and a bottom side of the second substrate, and connected with each other in series by penetrating through the second metal connecting hole of the second substrate; a first slide rail and a second slide rail, disposed between the first coil board and the second coil board; a first magnetic fixed component, fixed at a terminal of the first slide rail and the second slide rail; a second magnetic fixed component, fixed at another terminal of the first slide rail and the second slide rail; and a movable magnetic component, sandwiched between the first slide rail and the second slide rail, located between the first magnetic fixed component and the second magnetic fixed component, and generating a first magnetic repulsion and a second magnetic repulsion with the first magnetic fixed component and the second magnetic fixed component, respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
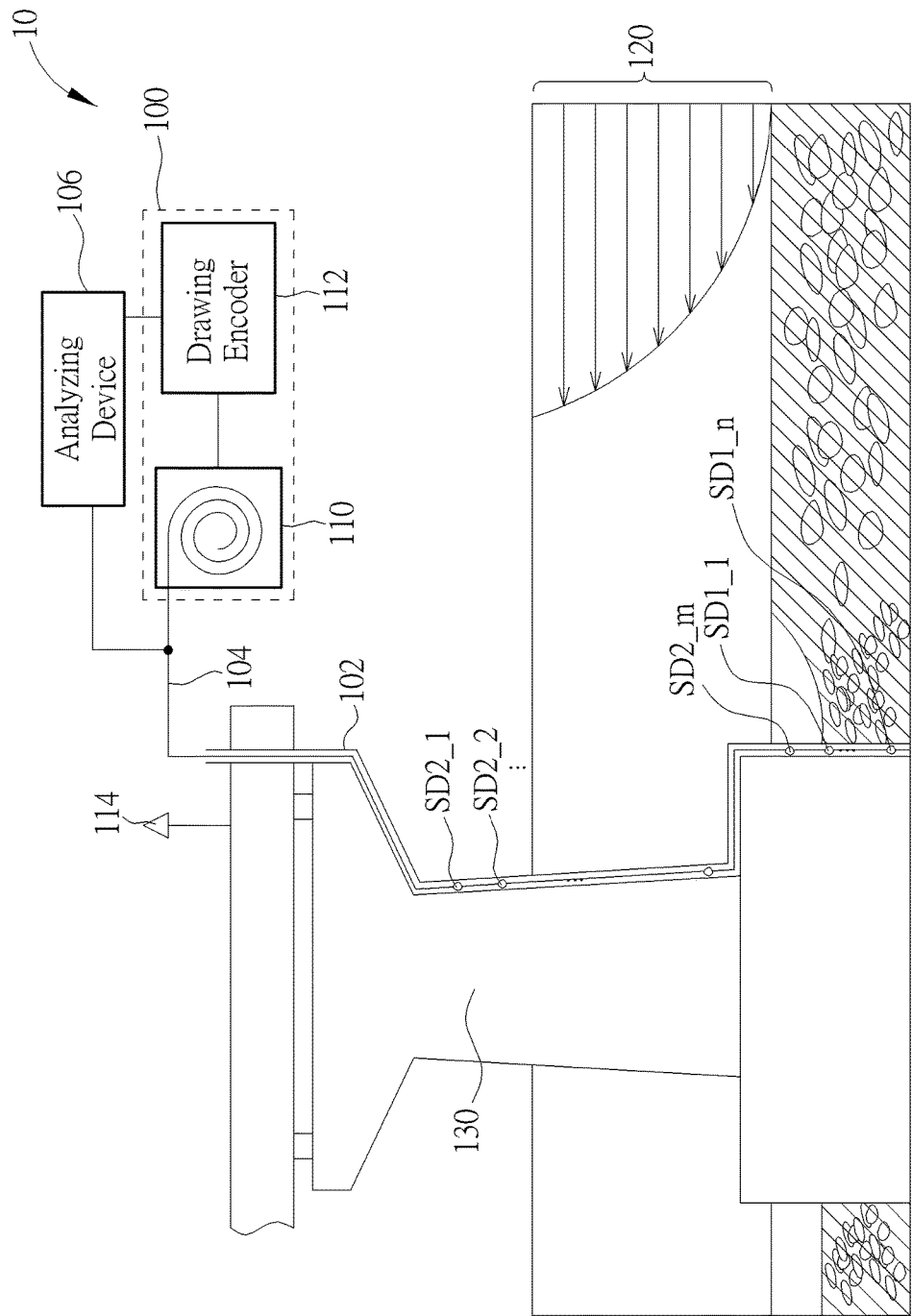
FIG. 1 is a schematic diagram of an environment monitoring system according to an embodiment of the invention.

Please refer to FIG. 1, which is a schematic diagram of an environment monitoring system 10 according to an embodiment of the invention. The environment monitoring system 10 is configured for monitoring an environmental variation status of a riverbed, a lake floor, or a seabed, such as a scouring depth of a structure layer, a water level, a water flow rate, etc., wherein the structure layer may be a sandstone layer, a deposit layer, a subsoil layer, a lithosphere layer, etc., and not limited herein. For brevity, the following illustrates an example of monitoring a scouring depth of a riverbed 120. The structure layer of the riverbed 120 is mainly the sandstone layer. As shown in FIG. 1, a bridge foundation 130 is located in the sandstone layer of the riverbed 120. When a sandstone layer 122 around the bridge foundation 130 is scoured by rapid water flow, the sandstone layer 122 is undermined and lowered. A depth of lowering can be regarded as the scouring depth of the riverbed 120. Moreover, since the scouring location is around the bridge foundation 130, the depth of lowering is also called the local scouring depth of the riverbed 120. In such a situation, the environment monitoring system 10 may be utilized for monitoring the scouring depth of the riverbed 120, such that measures can be taken in advance to avoid the bridge foundation 130 from being sagged seriously and collapses.

Specifically, the environment monitoring system 10 comprises a wire drawing device 100, a fixing pipe 102, a transmission wire 104, an analyzing device 106, and vibration sensing devices SD1_1-SD1_n, SD2_1-SD2_m. The fixing pipe 102 is fixed and disposed from a monitoring point 114 above the riverbed 120 along an edge of the bridge foundation 130 to the sandstone layer 122, and utilized for containing the transmission wire 104 and the vibration sensing devices SD1_1-SD1_n, SD2_1-SD2_m. In addition, the fixing pipe 102 is buried inside the sandstone layer 122, e.g., by means of penetrating the fixing pipe 102 into the sandstone layer 122 by an external force, or digging the sandstone layer 122 first and then imbedding the fixing pipe 102 inside, such that the fixing pipe 102 may be extended from the monitoring point 114 to the sandstone layer 122 under the river bed, so as to proceed to monitor the sandstone layer 122. The wire drawing device 100 is disposed at the monitoring point 114 and stores the transmission wire 104. The wire drawing device 100 comprises a drawing machine 110 and a drawing encoder 112. The drawing machine 110 is utilized for releasing the stored transmission wire 104 to an internal of the sandstone layer 122 from the monitoring point 114 through the fixing pipe 102. A length of the transmission wire 104 released or tighten by the drawing machine 110 is measured by the drawing encoder 112 connected to the drawing machine 110.

In addition, volumes of the vibration sensing devices SD1_1-SD1_n, SD2_1-SD2_m are small (e.g., 200 cubic millimeters), and thus, the vibration sensing devices SD1_1-SD1_n, SD2_1-SD2_m are represented in dots in FIG. 1. The vibration sensing devices SD1_1-SD1_n, SD2_1-SD2_m are disposed at different locations on the transmission wire 104, and contained in the fixing pipe 102 together with the transmission wire 104. Moreover, since the transmission wire 104 and the vibration sensing devices SD1_1-SD1_n, SD2_1-SD2_m are not fixed on the fixing pipe 102 but contained in the fixing pipe 102, the transmission wire 104 and the vibration sensing devices SD1_1-SD1_n, SD2_1-SD2_m may slide within the fixing pipe 102. Notably, the vibration sensing devices SD1_1-SD1_n, SD2_1-SD2_m do not need external electric power and be able to sense themselves whether to be vibrated. The vibration sensing devices SD1_1-SD1_n, SD2_1-SD2_m are disposed on the transmission wire 104; in addition, the vibration sensing devices SD1_1-SD1_n, SD2_1-SD2_m are electrically connected to wires L1_1-L1_n, L2_1-L2_m contained in the transmission wire 104, respectively (please refer to FIGS. 2B, 2C, 3 to see the details, which is narrated afterward). Thereby, the vibration sensing devices SD1_1-SD1_n, SD2_1-SD2_m may convert sensed vibration energy to electric signals with electric currents, and the generated electric signal may be transmitted by the corresponding wires L1_1-L1_n, L2_1-L2_m within the transmission wire 104. Furthermore, the vibration sensing devices SD1_1-SD1_n among the vibration sensing devices SD1_1-SD1_n, SD2_1-SD2_m are disposed within the internal of the sandstone layer 122, and the vibration sensing devices SD2_1-SD2_m are disposed between the monitoring point 114 and the sandstone layer 122 (i.e., out of the sandstone layer 122).

The analyzing device 106 is located at the monitoring point 114 above the riverbed 120 and coupled to the wire drawing device 100 and the transmission wire 104. The analyzing device 106 may be a traditional computer, a tablet computer, or a smart phone, and coupled to the wire drawing device 100 and the transmission wire 104 by wire line or wireless connections. Notably, the analyzing device 106 may also be implemented by application-specific integrated circuit (ASIC), or by a processor instructed by program code stored in a storage device, which is not limited herein. The storage device may be read-only memory (ROM), random-access memory (RAM), CD-ROMs, magnetic tapes, floppy disks, optical data storage devices, etc., and not limited herein. The analyzing device 106 receives the electric signals corresponding to the vibration sensing devices SD1_1-SD1_n, SD2_1-SD2_m from the wires L1_1-L1_n, L2_1-L2_m within the transmission wire 104, obtains the released length of the transmission wire 104 released by the wire drawing device 100 from the drawing encoder 112 of the wire drawing device 100, and performs analysis according to the electric signals corresponding to the vibration sensing devices SD1_1-SD1_n, SD2_1-SD2_m and the released length of the transmission wire 104, so as to determine the scouring depth of the sandstone layer 122 the scouring depth and perform monitoring.

Figure 2C:
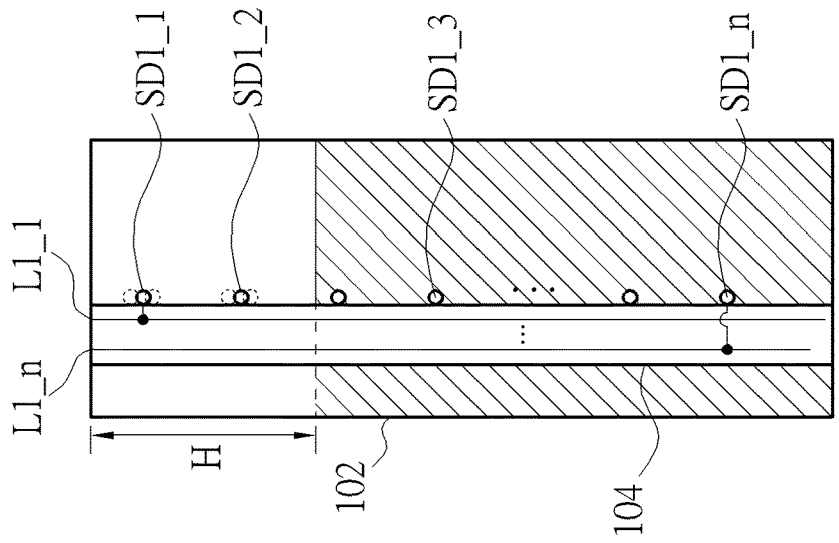
FIG. 2C is a schematic diagram of a fixing pipe in a sandstone layer when the sandstone layer is scoured and lowered, a plurality of vibration sensing devices and a transmission wire in FIG. 1.
Figure 2B:
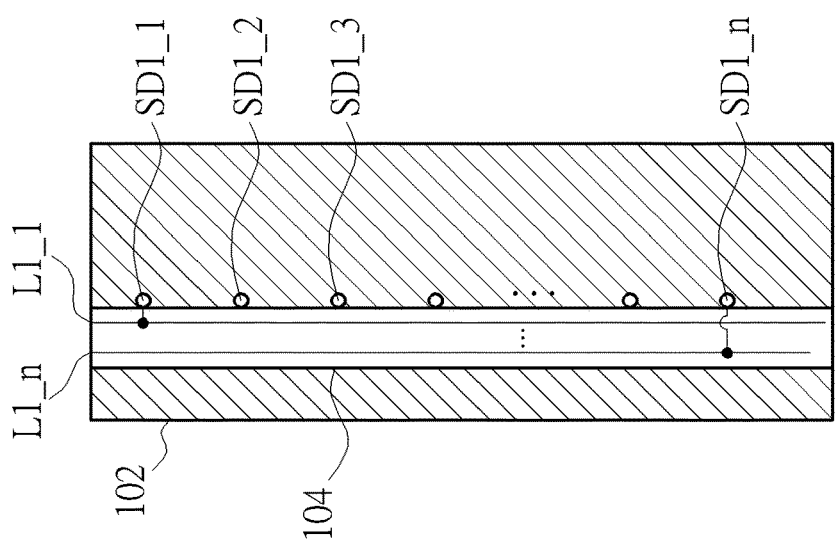
FIG. 2B is a schematic diagram of a fixing pipe in a sandstone layer, a plurality of vibration sensing devices and a transmission wire in FIG. 1.
Figure 2A:
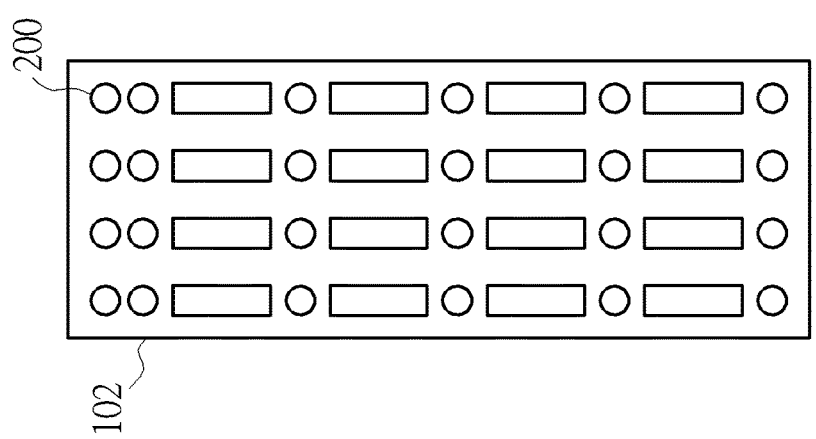
FIG. 2A is a schematic diagram of an external of a fixing pipe in FIG. 1.

In detail, please refer to FIGS. 2A-2C. FIG. 2A is a schematic diagram of an external of the fixing pipe 102 in FIG. 1. FIG. 2B is a schematic diagram of the fixing pipe 102 in the sandstone layer 122, the vibration sensing devices SD1_1-SD1_n and the transmission wire 104 in FIG. 1. FIG. 2C is a schematic diagram of the fixing pipe 102 in the sandstone layer 122 when the sandstone layer 122 is scoured and lowered, the vibration sensing devices SD1_1-SD1_n and the transmission wire 104 in FIG. 1. As shown in FIG. 2A, the fixing pipe 102 is a hollow steel pipe comprising holes 200. The fixing pipe 102 may be other hollow pipes made of other material such as iron or aluminum, and not limited herein. A pipe diameter of the fixing pipe 102 is greater than a wire diameter of the transmission wire 104 and volumes of each of the vibration sensing devices SD1_1-SD1_n, SD2_1-SD2_m. The fixing pipe 102 is able to contain the transmission wire 104 and the vibration sensing devices SD1_1-SD1_n, SD2_1-SD2_m. Moreover, shapes of the holes 200 can be circle, square, diamond, rectangular, etc., and not limited herein. A number of the holes 200 may also be modified according to practical requirements. The holes 200 are utilized for passing the water flow or sandstone through the fixing pipe 102, such that the vibration sensing devices SD2_1-SD2_m out of the sandstone layer 122 may sense the water flowing through the fixing pipe 102, and the vibration sensing devices SD1_1-SD1_n within the internal of the sandstone layer 122 and the transmission wire 104 maybe fixed by being covered by the sandstone passing through the fixing pipe 102.

As shown in FIG. 2B, in the fixing pipe 102 within the internal of the sandstone layer 122, the sandstone (i.e., the hatched region in FIG. 2B) passes through the fixing pipe 102 and covers the transmission wire 104 and the vibration sensing devices SD1_1-SD1_n, such that the vibration sensing devices SD1_1-SD1_n would not be vibrated by the water flow. Moreover, the vibration sensing devices SD1_1-SD1_n are evenly disposed at different locations on the transmission wire 104. The disposed locations are not fixed, and may be modified according to practical requirements. In addition, the vibration sensing devices SD1_1-SD1_n are electrically connected to the corresponding wires L1_1-L1_n within the transmission wire 104, so as to send the electric signals generated by the vibration sensing devices SD1_1-SD1_n through the wires L1_1-L1_n.

In addition, when the sandstone layer 122 is scoured and lowered, as shown in FIG. 2B, the sand stone passing through the fixing pipe 102 and covering the transmission wire 104 and the vibration sensing devices SD1_1-SD1_n would be scoured and lowered by a scouring depth H, such that the vibration sensing devices SD1_1, SD1_2 are no longer fixed by the sandstone. Meanwhile, according to a gravity force of the transmission wire 104 and also a thrust force brought by water flow acting on the transmission wire 104, the transmission wire 104 would be released a released length L, which is approximately the scouring depth H from the wire drawing device 100 above the riverbed 120.

In such a situation, the analyzing device 106 above the riverbed 120 receives the electric signals generated by the vibration sensing devices SD1_1-SD1_n through the wires L1_1-L1_n of the transmission wire 104, performs analysis, and generates corresponding sensing results RES1_1-RES1_n, so as to obtain information about whether the vibration sensing devices SD1_1-SD1_n are vibrated. For example, the analyzing device 106 may determine the vibration sensing device SD1_1 is vibrated when a voltage of the electric signal generated by the vibration sensing devices SD1_1 is greater than a pre-defined value, and generates the corresponding sensing result RES1_1 to indicate that the vibration sensing device SD1_1 is vibrated. In FIG. 2C, since the vibration sensing device SD1_1-SD1_2 are not covered by the sandstone and vibrated by the water flow, the sensing results RES1_1-RES1_2 generated by the analyzing device 106 indicate that the vibration sensing devices SD1_1-SD1_2 are vibrated, and the analyzing device 106 obtains information of the sandstone layer 122 being scoured and lowered. Furthermore, after the analyzing device 106 obtains the released length L of the transmission wire 104 from the drawing encoder 112 of the wire drawing device 100, under a condition that the analyzing device 106 obtains information about the sandstone layer 122 being scoured, the analyzing device 106 may precisely determine that the scouring depth H of the riverbed 120 is the released length L.

In another perspective, according a spacing between the vibration sensing devices SD1_1-SD1_2 disposed on the transmission wire 104, the analyzing device 106 may also compute a total distribution length of the vibration sensing devices SD1_1-SD1_2 disposed on the transmission wire 104, and compares the total distribution length of the vibration sensing devices SD1_1-SD1_2 and the released length L to see whether the total distribution length is matched to or closed to the released length L. When the analyzing device 106 compares and finds that the total distribution length of the vibration sensing devices SD1_1-SD1_2 is matched to the released length L, the analyzing device 106 may further determine that the scouring depth H of the riverbed 120 is approximately the released length L.

In other words, the environment monitoring system 10 utilizes the vibration sensing devices SD1_1-SD1_n with the properties of converting the vibration energy into the electric signals without relying on external electric power, disposes the vibration sensing devices SD1_1-SD1_n on the transmission wire 104, and makes the vibration sensing devices SD1_1-SD1_n be covered in the sandstone layer 122 before the sandstone layer 122 is scoured. When the sandstone layer 122 is scoured and lowered, the environment monitoring system 10 may receive the electric signals generated by the vibration sensing devices SD1_1-SD1_n from the transmission wire 104, and obtain information of the sandstone layer 122 being scoured. Furthermore, the environment monitoring system 10 determines the scouring depth of the riverbed 120 according the released length of the transmission wire 104. Thereby, the environment monitoring system 10 does not have to provide electric power to the vibration sensing devices SD1_1-SD1_n through the transmission wire 104, and easily obtains information of the scouring depth of the riverbed 120, so as to perform monitoring precisely.

Figure 3:
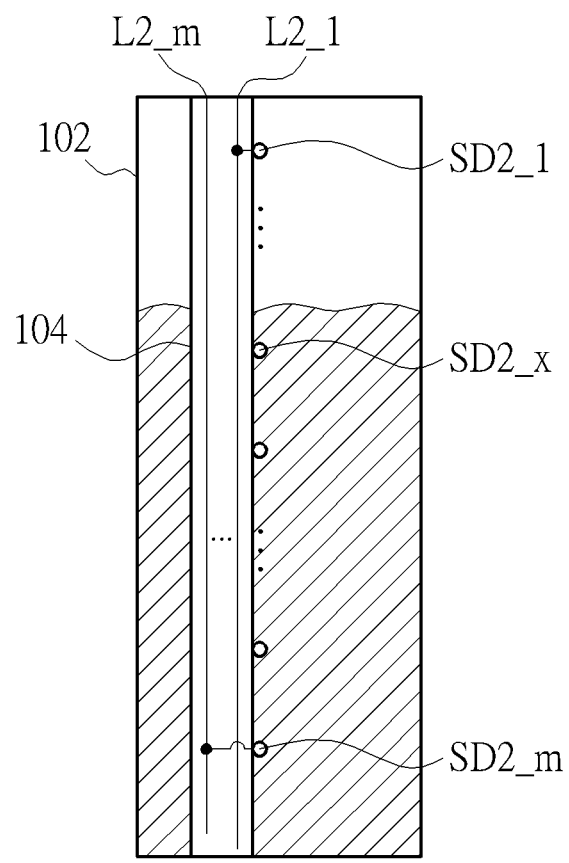
FIG. 3 is a schematic diagram of a fixing pipe not in a sandstone layer 122, a plurality of vibration sensing devices and a transmission wire in FIG. 1.

In addition, the environment monitoring system 10 may further monitor a water level and a water flow rate of the riverbed 120 by utilizing the vibration sensing devices SD2_1-SD2_m out of the sandstone layer 122. Specifically, please refer to FIG. 3, which is a schematic diagram of the fixing pipe 102 out of the sandstone layer 122, the vibration sensing devices SD2_1-SD2_m and the transmission wire 104 in FIG. 1. As shown in FIG. 3, the transmission wire 104 and the vibration sensing devices SD2_1-SD2_m are contained in the fixing pipe 102 and disposed along the edge of the bridge foundation 130. In the fixing pipe 102, the water flow (i.e., the hatched region in FIG. 3) may pass through the fixing pipe 102 and flow through the vibration sensing devices SD2_x-SD2_m of the vibration sensing devices SD2_1-SD2_m. In such a situation, the vibration sensing devices SD2_x-SD2_m are vibrated by the water flow, and the rest of the vibration sensing devices SD2_1-SD2_x-1 are vibrated by air flow.

Therefore, the analyzing device 106 above the riverbed 120 receives the electric signals generated by the vibration sensing devices SD2_1-SD2_m through the wires L2_1-L2_m of the transmission wire 104, and performs analysis, to obtain information of vibration degree of the vibration sensing devices SD2_1-SD2_m. For example, the analyzing device 106 may generate vibration degrees of the vibration sensing devices SD2_1-SD2_m according to voltages of the electric signals generated by the vibration sensing devices SD2_1-SD2_m, or the analyzing device 106 may first compute energies of the electric signals generated by the vibration sensing devices SD2_1-SD2_m and generate the vibration degrees of the vibration sensing devices SD2_1-SD2_m accordingly, which may be modified according to practical requirements. Furthermore, since the vibration energy brought by the water flow is larger than the vibration energy brought by the airflow, the analyzing device 106 determine the vibration sensing devices SD2_x-SD2_m which are vibrated by the water flow according to the vibration degrees of the vibration sensing devices SD2_1-SD2_m.

In addition, since the vibration sensing devices SD2_1-SD2_m are disposed on the transmission wire 104 first and then placed into the fixing pipe 102 connecting the sandstone layer 122 along the edge of the bridge foundation 130, horizontal levels of the vibration sensing devices SD2_1-SD2_m in relation to a horizontal reference point may be obtained by measured and computed in advance, and stored in the analyzing device 106. Therefore, the analyzing device 106 may determine a highest level among the horizontal levels of the vibration sensing devices SD2_x-SD2_m according to the information of the horizontal levels of the vibration sensing devices SD2_1-SD2_m, and obtain the water level of the riverbed 120 being the horizontal level of the vibration sensing device SD2_x. Furthermore, since relationship between the water flow rate and the vibration degrees of the vibration sensing devices may be measured and recorded as a rate determining information, stored in the analyzing device 106, the analyzing device 106 may obtain the water flow rates corresponding to the vibration degrees corresponding to the vibration sensing devices SD2_x-SD2_m according to the stored rate determining information, so as to determine the water flow rates at the horizontal levels of the vibration sensing devices SD2_x-SD2_m.

Notably, since the vibration sensing devices SD2_1-SD2_m are not fixed in the fixing pipe 102, when the sandstone layer 122 is scoured and lowered, the horizontal levels of the vibration sensing devices SD2_1-SD2_m would be lower than the horizontal levels previously recorded, and the transmission wire 104 would be released the length of the scouring depth from the monitoring point 114 above the riverbed 120. In such a situation, a more actual water level is computed according to the water level obtained by the analyzing device 106 and the scouring depth of the riverbed determined in the above. Alternatively, in another embodiment, the vibration sensing devices SD2_1-SD2_m may be fixed together with the transmission wire 104 in the fixing pipe 102, so as to monitor the water level and the water flow rate of the riverbed 120 only. Thereby, since the vibration sensing devices SD2_1-SD2_m are fixed in the fixing pipe 102 and would not be affected by the lower sandstone, the analyzing device 106 may directly obtain the water level and the corresponding water flow rate according to the horizontal levels of the vibration sensing devices SD2_1-SD2_m.

In other words, the environment monitoring system 10 may determine the scouring depth of the riverbed 120, in addition, the environment monitoring system 10 utilizes the vibration sensing devices SD2_1-SD2_m with the properties of converting the vibration energy into the electric signals without relying on external electric power, and easily obtains information the water level and the corresponding water flow rate of the riverbed 120 according to the vibration degrees sensed by the vibration sensing devices SD2_1-SD2_m on the transmission wire 104, to perform monitoring precisely.

Figure 4:
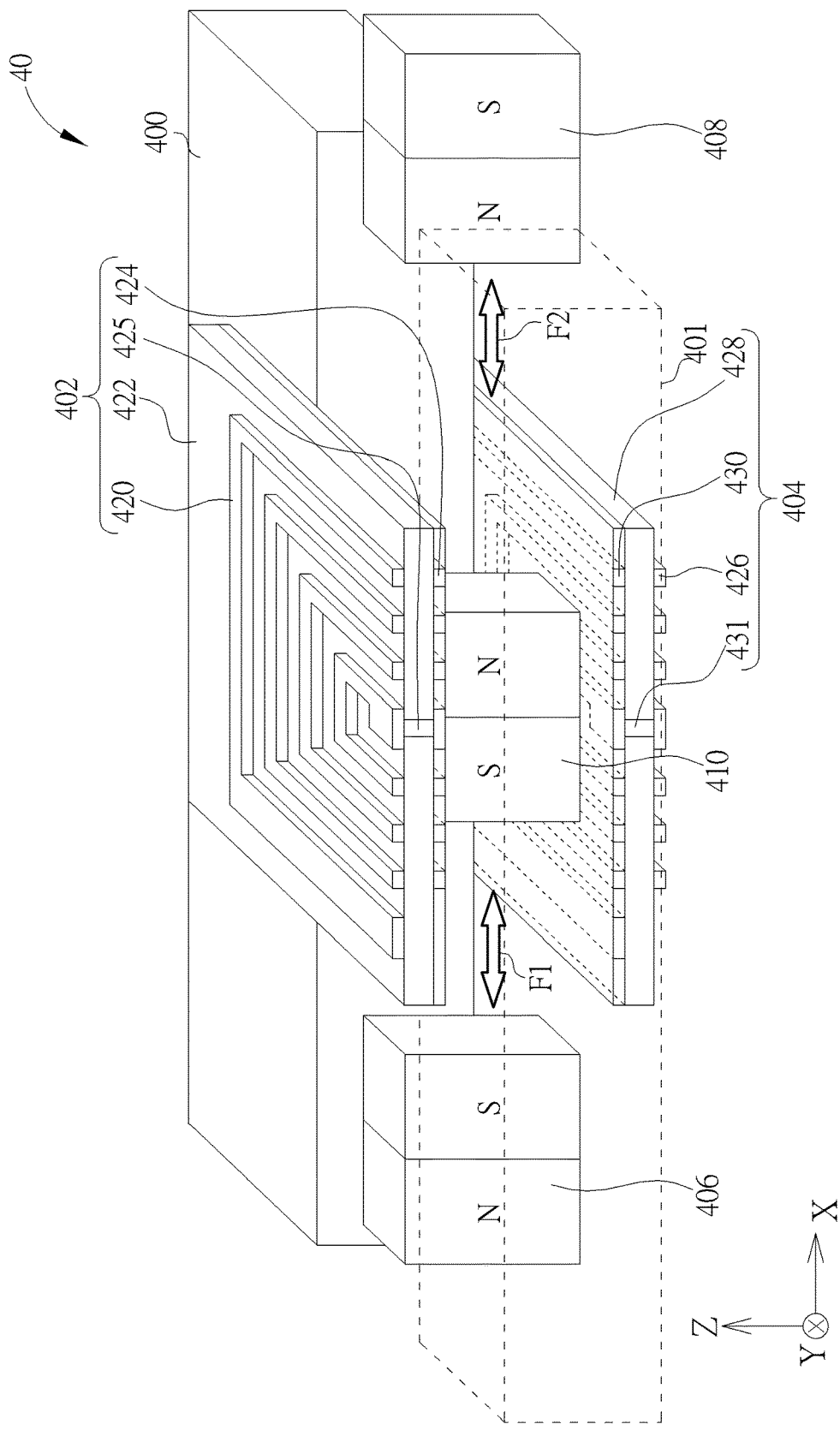
FIG. 4 is a side view of components of a vibration sensing device according to an embodiment of the invention.

Therefore, the environment monitoring system 10 may determine environmental variation status according to the electric signals generated by the vibration sensing devices SD1_1-SD1_n, SD2_1-SD2_m, so as to obtain information of the scouring depth of the riverbed 120, the water level, and the water flow rate. As for the realizations of the vibration sensing devices SD1_1-SD1_n, SD2_1-SD2_m, those who skilled in the art may make modification and alternation accordingly, and not limited. Specifically, please refer to FIG. 4, which is a side view of components of a vibration sensing device 40 according to an embodiment of the invention. As shown in FIG. 4, the vibration sensing device 40 comprises a first slide rail 400, a second slide rail 401, a first coil board 402, a second coil board 404, a first magnetic fixed component 406, a second magnetic fixed component 408 and a movable magnetic component 410. The vibration sensing device 40 may be implemented via a micro electromechanical system (MEMS) technology, and a volume thereof is extremely small, e.g., 132 cubic millimeters. The vibration sensing device 40 does not have to receive external electric power, and be able to convert the sensed vibration energy into the electric signals. The electric signals are outputted by the first coil board 402 and the second coil board 404, or outputted by combining the first coil board 402 and the second coil board 404 together.

In detail, the first coil board 402 and the second coil board 404 are mutually disposed in parallel with each other in a z-axis direction, and the first slide rail 400 and the second slide rail 401 in shape as long bars are disposed in an x-axis direction between the first coil board 402 and the second coil board 404. For brevity, the second slide rail 401 is shown in perspective. A structure of the second slide rail 401 corresponds to the first slide rail 400, such that the first magnetic fixed component 406, the second magnetic fixed component 408 and the movable magnetic component 410 are sandwiched between the first slide rail 400 and the second slide rail 401. The first coil board 402 comprises metal coils 420, 424, a substrate 422 and a metal connecting hole 425; the second coil board 404 comprises metal coils 426, 430, a substrate 428 and a metal connecting hole 431. The metal coils 420, 424, 426, 430 are made of metal material, and forms circle metal coils as spirals (or other shapes which surrounds as closed planes). The metal coils 420, 424, 426, 430 are respectively disposed on a top side and a bottom side of the substrates 422, 428, and respectively connected with each other in series by penetrating through the metal connecting hole 425, 431. Take the first coil board 402 as an example, the metal connecting hole 425 penetrates through the substrate 422, and connects the metal coil 420 disposed on the top side of the substrate 422 with the metal coil 424 on the bottom side of the substrate 422 in series. Similarly, the metal connecting hole 431 penetrates through the substrate 428, and connects the metal coil 430 disposed on the top side of the substrate 428 with the metal coil 426 disposed on the bottom side the substrate 428 in series. Numbers of turns of the metal coils 420, 424, 426 and 430 may be 24 turns or 48 turns, which are not limited herein and may be modified according to practical containable volume. Furthermore, the metal coil 420 or 424 disposed on the substrate 422 may further be connected in series with the metal coil 426 or 430 disposed on the substrate 428, and a three dimensional stacked coil structure is formed, such that the metal coils 420, 424, 426 and 430 may increase voltages of the generated electric signals effectively by means of increasing the turn numbers, penetrating and connecting the coils in series, connecting the two coils in series, etc., under the limited volume.

In another perspective, the first magnetic fixed component 406, the second magnetic fixed component 408 and the movable magnetic component 410 are optionally made of neodymium-iron-boron (NdFeB) material or other permanent magnetic component, and not limited herein. The first magnetic fixed component 406 and the second magnetic fixed component 408 are respectively fixed at two terminals in the x-axis direction of the first slide rail 400 and the second slide rail 401. A height of the movable magnetic component 410 is substantially equal to a distance between the metal coil 424 of the first coil board 402 and the metal coil 430 of the second coil board 404, such that the movable magnetic component 410 may be sandwiched between the metal coils 424, 430 of the first coil board 402 and the second coil board 404, and slide along the x-axis direction. Moreover, In FIG. 4, magnetic polarities of the first magnetic fixed component 406, the second magnetic fixed component 408 and the movable magnetic component 410 are denoted in FIG. 4 as pole signs directly, for illustrating conveniently. The first magnetic fixed component 406 and the second magnetic fixed component 408 have S magnetic poles at a positive direction of x-axis, and have N magnetic poles at a negative direction of x-axis. The movable magnetic component 410 has N magnetic pole at the positive direction of x-axis, and has S magnetic pole at the negative direction of x-axis.

In such a situation, the first magnetic fixed component 406 and the second magnetic fixed component 408 respectively generate a first magnetic repulsion F1 and a second magnetic repulsion F2 with the movable magnetic component 410. When the movable magnetic component 410 is moved by an external force in the x-axis direction, distances of the movable magnetic component 410 with the first magnetic fixed component 406 and the second magnetic fixed component 408 vary. The smaller the distance between two magnetic components, the larger the magnetic repulsion generated. Thus, the first magnetic repulsion F1 and the second magnetic repulsion F2 vary corresponding to distance variation, such that the movable magnetic component 410 is forced and oscillates between the first magnetic fixed component 406 and the second magnetic fixed component 408. Furthermore, according to Faraday's Law, in a closed conductive loop, if magnetic flux of the loop varies with time, the loop produces induced current and induced voltage. Thereby, since the movable magnetic component 410 oscillates between the metal coil 420 (and 424) and the metal coil 426 (and 430), the movable magnetic component 410 induces the electric signals with currents and voltages in the closed loop of the metal coils 420, 424, 426 and 430.

In other words, when the movable magnetic component 410 is moved by vibration in the x-axis direction, the vibration sensing device 40 utilizes a virtual cantilever structure (the structure is constructed by magnetic repulsion forces instead of constructions physically built and connected, and thus called "virtual") formed by the first magnetic fixed component 406, the second magnetic fixed component 408 and the movable magnetic component 410, to make the movable magnetic component 410 move back and forth in the axis direction, and induces the electric signals by the metal coils 420, 424, 426 and 430 according to the vibration energy sensed in the x-axis direction. Therefore, the vibration sensing device 40 may avoid the rigid limitation of the physical connection structure, and enlarge a frequency range of sensed vibration. For example, the vibration sensing device 40 may sense vibration with frequency from 1 Hz to 1000 Hz, such the generated electric signals response the frequency and the energy of the vibration more precisely, so as to be applied for more general needs.

Figure 5A:
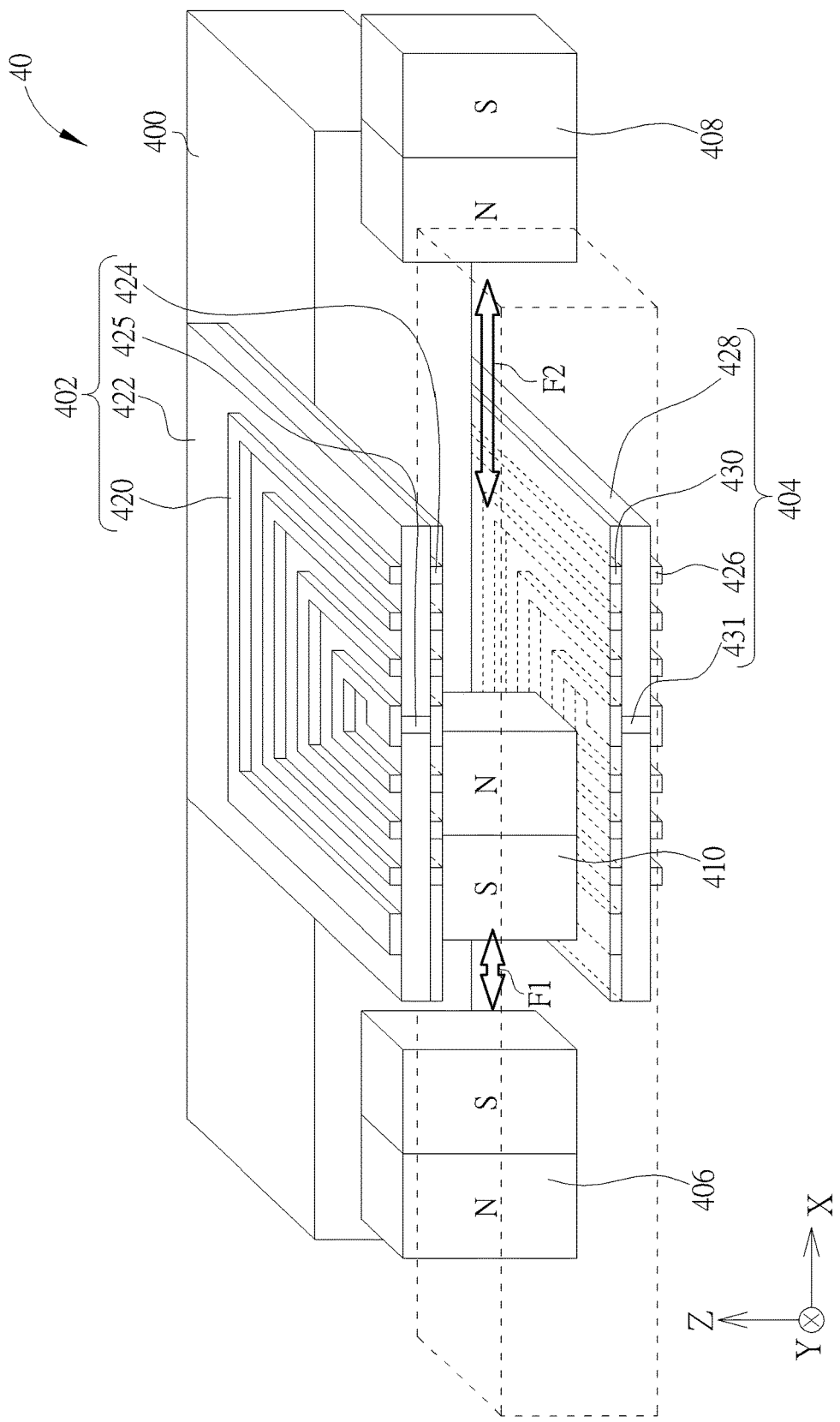
FIGS. 5A-5B are schematic diagrams of operational situation of the vibration sensing device in FIG. 4.
Figure 5B:
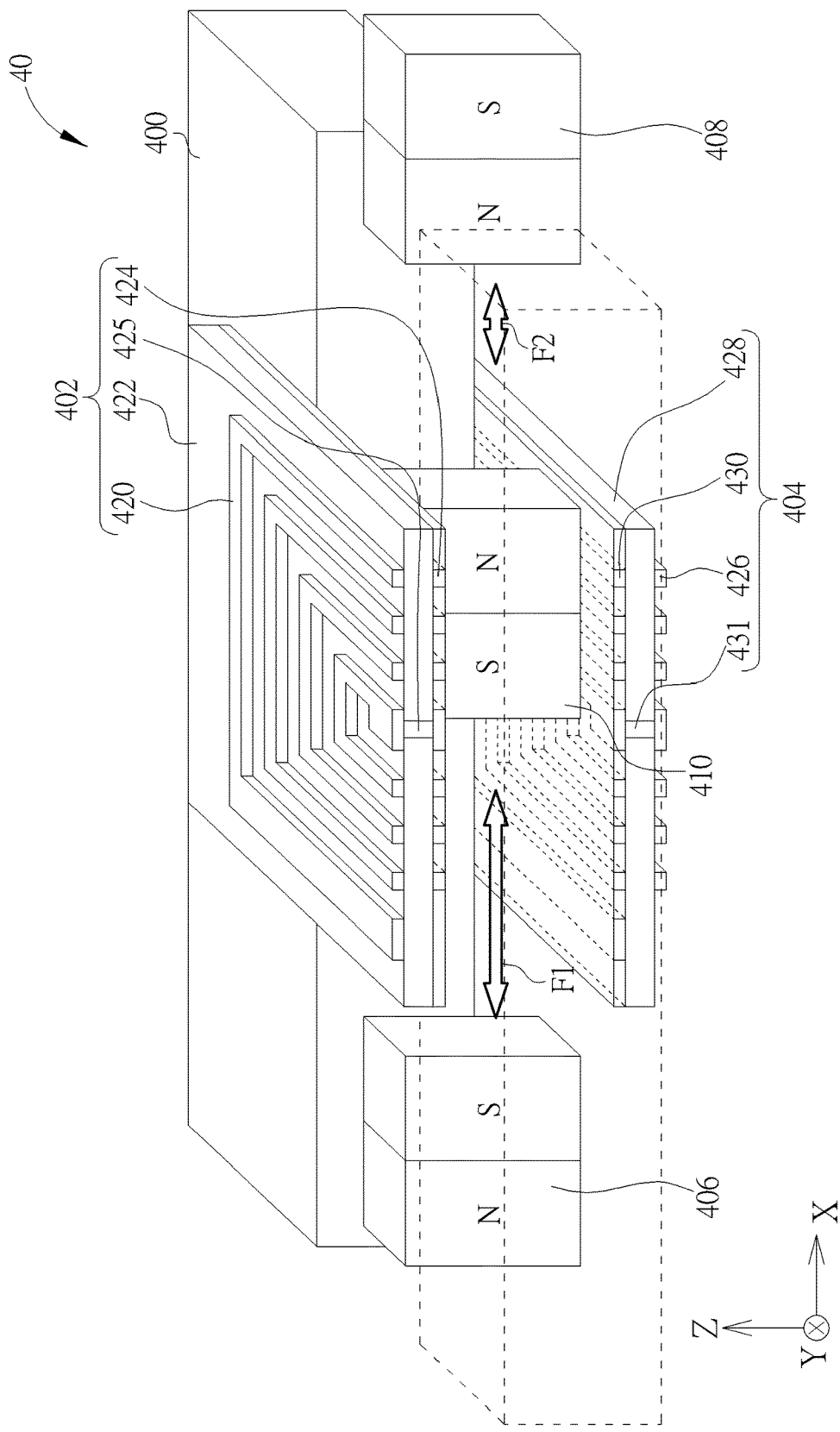

In addition, please refer to FIGS. 5A-5B, which are schematic diagrams of operational situations of the vibration sensing device in FIG. 4. First of all, as shown in FIG. 5A, when the vibration sensing device 40 is vibrated, the movable magnetic component 410 is forced by an external force in the x-axis direction, deviated from a magnetic equilibrium, and moved toward the first magnetic fixed component 406. The distance between the movable magnetic component 410 and the first magnetic fixed component 406 is gradually shortened, and the first magnetic repulsion F1 is gradually enhanced. The gradually enhanced first magnetic repulsion F1 finally stops the movable magnetic component 410 moving toward the first magnetic fixed component 406, and pushes the movable magnetic component 410 toward the second magnetic fixed component 408. Then, as shown in FIG. 5B, since the movable magnetic component 410 is pushed by the first magnetic repulsion F1 and moves through the magnetic equilibrium and toward the second magnetic fixed component 408, the distance between the movable magnetic component 410 and the second magnetic fixed component 408 is gradually shortened, and the second magnetic repulsion F2 is gradually enhanced. The gradually enhanced second magnetic repulsion F2 stops the movable magnetic component 410 moving toward the second magnetic fixed component 408, and pushes the movable magnetic component 410 toward the first magnetic fixed component 406 again. Finally, the movable magnetic component 410 would move back and forth along the slide rail 400 in the x-axis direction, and continuously induce the electric signals with the closed metal coils 420, 424, 426 and 430. If the vibration sensing device 40 is no longer vibrated, distances of the movable magnetic component 410 moving back and forth are gradually shortened due to external friction, and the movable magnetic component 410 would stop at the equilibrium (as shown in FIG. 4).

Thereby, the vibration sensing device 40 utilizes the metal coils 420, 424, 426, 430 and the virtual cantilever structure formed by the first magnetic fixed component 406, the second magnetic fixed component 408 and the movable magnetic component 410, to convert the vibration energy of the external environment to the electric signals, and the voltage thereof are proportional to the vibration energy, such that the vibration sensing device 40 does not have to receive external electric power and be able to sense quantities of the vibration energy. In addition, since the movable magnetic component 410 is constrained to move along the x-axis direction, the vibration sensing device 40 may sense vibration in a specific direction (i.e., the x-axis direction). Furthermore, the vibration sensing device 40 may flexibly combine more vibration sensing devices with the same type, to sense vibration in different directions (e.g., the y-axis or the z-axis direction), such that the vibration sensing device 40 has extensibility of sensing vibration in multiple directions, in addition to precisely sensing vibration in a specific direction.

In short, the environment monitoring system 10 of the present invention easily obtains the information of whether the sandstone layer under the riverbed is scoured, by utilizing the vibration sensing devices covered in the sandstone layer under the riverbed without external electric power, and determines the scouring depth of the riverbed precisely. In addition, the environment monitoring system 10 of the present invention also determines the water level and the water flow rate of the riverbed by utilizing the vibration sensing devices to sense the vibration caused by the water flow of the riverbed. Those who skilled in the art may make modification and alternation accordingly For example, in the current embodiment, when the sandstone layer 122 is scoured and lowered, the environment monitoring system 10 obtains the released length L of the transmission wire 104 from the wire drawing device 100 according to the gravity force of the transmission wire 104 and the thrust force brought by water flow acting on the transmission wire 104. In another embodiment, the environment monitoring system 10 may further dispose heavy object such as a plumb or an iron ball. As the sandstone layer 122 is scoured and lowered, the transmission line is released by the plumb or the iron ball which is not covered by the sandstone, such that the released length L is obtained. Methods making the released length L more closed to the scouring depth H may be modified according to practical requirements, and not limited herein. In addition, the embodiments in the above takes the riverbed 120 as an example to illustrate how to monitor the environmental variation status such as the scouring depth, the water level, the water flow rate, etc., of the riverbed 120 by the environment monitoring system 10. However, the environment monitoring system 10 is not limited to be utilized for monitoring a riverbed. The environment monitoring system 10 may also be utilized for monitoring scouring condition of a lake floor, or a seabed, and be cooperated with equipment such as offshore wind turbines, oil rig, etc., to make sure the equipment operate normally.

Furthermore, the vibration sensing device 40 is applied in the environment monitoring system 10 to monitor the scouring depth, the water level, the water flow rate of the riverbed 120, in addition, the vibration sensing device 40 maybe further applied in other device which needs vibration sensing, e.g., in tablet computers or in smart phones, so as to sense vibration in any specific direction and perform correspond operations. In addition, in the current embodiment, the first magnetic fixed component 406 and the second magnetic fixed component 408 of the vibration sensing device 40 have S magnetic poles at the positive direction of x-axis and have N magnetic poles at the negative direction of x-axis, and the movable magnetic component 410 has N magnetic pole at the positive direction of x-axis and has S magnetic pole at the negative direction of x-axis, so as to generate the first magnetic repulsion F1 and the second magnetic repulsion F2. Nevertheless, in other embodiments, the first magnetic fixed component 406 and the second magnetic fixed component 408 of the vibration sensing device 40 have N magnetic poles at the positive direction of x-axis and have S magnetic poles at the negative direction of x-axis, and the movable magnetic component 410 has S magnetic pole at the positive direction of x-axis and has N magnetic pole at the negative direction of x-axis, which also allows the first magnetic fixed component 406 and the second magnetic fixed component 408 generating the first magnetic repulsion F1 and the second magnetic repulsion F2 with the movable magnetic component 410, respectively, and not limited herein.

In summary, when the riverbed is scoured and lowered rapidly, the bridge foundation is exposed seriously, which may lead to the bridge foundation being sagged, tilted, sideshifted, or even collapsed. The present invention may easily and precisely monitor the scouring depth of the riverbed by utilizing the vibration sensing devices which do not need external electric power, and prevent the disasters of the bridge foundation being scoured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An environment monitoring system, configured for monitoring an environmental variation status of a riverbed, a lake floor, or a seabed, the environment monitoring system comprising:
    a wire drawing device, disposed at a monitoring point above the riverbed, the lake floor or the seabed, for releasing and tightening a transmission wire;
    a fixing pipe, laid between the monitoring point and an internal of a structure layer of the riverbed, the lake floor or the seabed, for containing the transmission wire, to draw the transmission wire from the internal of the structure layer to the wire drawing device, wherein holes are formed on a perimeter wall of the fixing pipe to allow water flow or sandstone passing through the fixing pipe;
    a plurality of vibration sensing devices, electrically connected to a plurality of wires within the transmission wire, sliding within the fixing pipe, configured to sense vibration energy caused by water flow and convert the sensed vibration energy to a plurality of electric signals correspondingly and transmitting the plurality of electric signals via the transmission wire; and
    an analyzing device, coupled to the wire drawing device and the transmission wire, for obtaining a released length of the transmission wire from the wire drawing device, receiving the plurality of electric signals from the transmission wire, and determining the environmental variation status according to the released length and the plurality of electric signals to perform monitoring.

2. The environment monitoring system of claim 1, wherein the wire drawing device comprises:
    a drawing machine, for releasing and tightening the transmission wire; and
    a drawing encoder, connected to the drawing machine, for measuring a length of the transmission wire released and tightened by the drawing machine.

3. The environment monitoring system of claim 1, wherein the plurality of vibration sensing devices comprise:
    a plurality of first vibration sensing devices, disposed at different locations on a first part of the transmission wire within the structure layer, and fixed by being covered by the structure layer with the transmission wire; and
    a plurality of second vibration sensing devices, disposed at different locations on a second part of the transmission wire out of the structure layer;
    wherein when the structure layer is scoured and lowered, some of the plurality of first vibration sensing devices are no longer covered by the structure layer and have vibration;
    wherein the transmission wire is released from the wire drawing device by gravity.

4. The environment monitoring system of claim 3, wherein the analyzing device determines the first vibration sensing devices having vibration among the plurality of first vibration sensing devices according to a plurality of sensing results, and computes a total distribution length of the first vibration sensing devices having vibration among the plurality of first vibration sensing devices disposed on the transmission wire, so as to determine the released length as a scouring depth of the environmental variation status when the total distribution length is matched to the released length.

5. The environment monitoring system of claim 3, wherein the analyzing device performs analysis on the plurality of electric signals, obtains vibration degrees of the plurality of second vibration sensing devices, and determines a water level and a water flow rate of the environmental variation status according to the vibration degrees of the plurality of second vibration sensing devices.

6. The environment monitoring system of claim 5, wherein the analyzing device determines second vibration sensing devices having vibration caused by the water flow among the plurality of second vibration sensing devices according to the vibration degrees of the plurality of second vibration sensing devices, and obtains a highest level from horizontal levels of the second vibration sensing devices having vibration caused by the water flow among the plurality of second vibration sensing devices, so as to determine the highest level as the water level of the environmental variation status.

7. The environment monitoring system of claim 5, wherein the analyzing device compares the vibration degrees of the second vibration sensing devices having vibration caused by the water flow among the plurality of second vibration sensing devices with a rate determining information recording a relationship between water flow rate and vibration degree, so as to obtain the water flow rate of the environmental variation status.

* * * * *